United States Patent [19]

Dinovo

[11] 4,389,381

[45] Jun. 21, 1983

[54] LIMESTONE CALCINATION

[75] Inventor: Salvatore T. Dinovo, Columbus, OH

[73] Assignee: Battelle Development Corporation, Columbus, Ohio

[21] Appl. No.: 188,932

[22] Filed: Sep. 19, 1980

[51] Int. Cl.$^3$ .............................................. C01F 11/06
[52] U.S. Cl. ................................... 423/175; 423/637; 423/DIG. 16; 432/15
[58] Field of Search ............ 423/175, 177, 637, 659 F, 423/16, DIG. 16; 432/15

[56] References Cited

U.S. PATENT DOCUMENTS

| | | | |
|---|---|---|---|
| 2,533,026 | 12/1950 | Matheson | 423/177 |
| 2,670,193 | 2/1954 | Pyzel | 423/DIG. 16 |
| 2,684,931 | 7/1954 | Berg | 423/DIG. 16 |
| 2,700,592 | 1/1955 | Heath | 423/DIG. 16 |
| 3,266,788 | 8/1966 | Jukkola | 423/659 F |
| 4,076,796 | 2/1978 | Reh | 423/177 |
| 4,084,545 | 4/1978 | Nack et al. | 110/342 |
| 4,154,581 | 5/1979 | Nack et al. | 423/DIG. 16 |
| 4,157,245 | 6/1979 | Mitchell et al. | 423/DIG. 16 |

FOREIGN PATENT DOCUMENTS

| | | | |
|---|---|---|---|
| 527801 | 7/1956 | Canada | 423/DIG. 16 |
| 674163 | 11/1963 | Canada | 423/DIG. 16 |
| 583066 | 12/1976 | Switzerland | 423/DIG. 16 |
| 1508777 | 4/1978 | United Kingdom | 423/DIG. 16 |

OTHER PUBLICATIONS

Reh, "Fluidized Bed Processing," *Chemical Engineering Progress*, vol. 67, No. 2, (Feb. 1971), pp. 58–63.
Reh, L., "Fluid Bed Combustion in Processing, Environmental Protection and Energy Supply," American Flame Research Committe, International Symposium on Fluidized Bed Combustion, Boston, Apr. 30, 1979.
"Fluidization," *Chemical Engineering* (Dec. 1947), 112–115.

*Primary Examiner*—O. R. Vertiz
*Assistant Examiner*—Wayne A. Langel
*Attorney, Agent, or Firm*—Barry S. Bissell

[57] ABSTRACT

Calcination of limestone to form a finely divided lime product without substantial contamination by impurities (especially carbon and ash) is accomplished in a secondary fluidized bed with reaction heat provided by recirculating entrained particles from a primary multisolid fluidized bed combustor.

4 Claims, 2 Drawing Figures

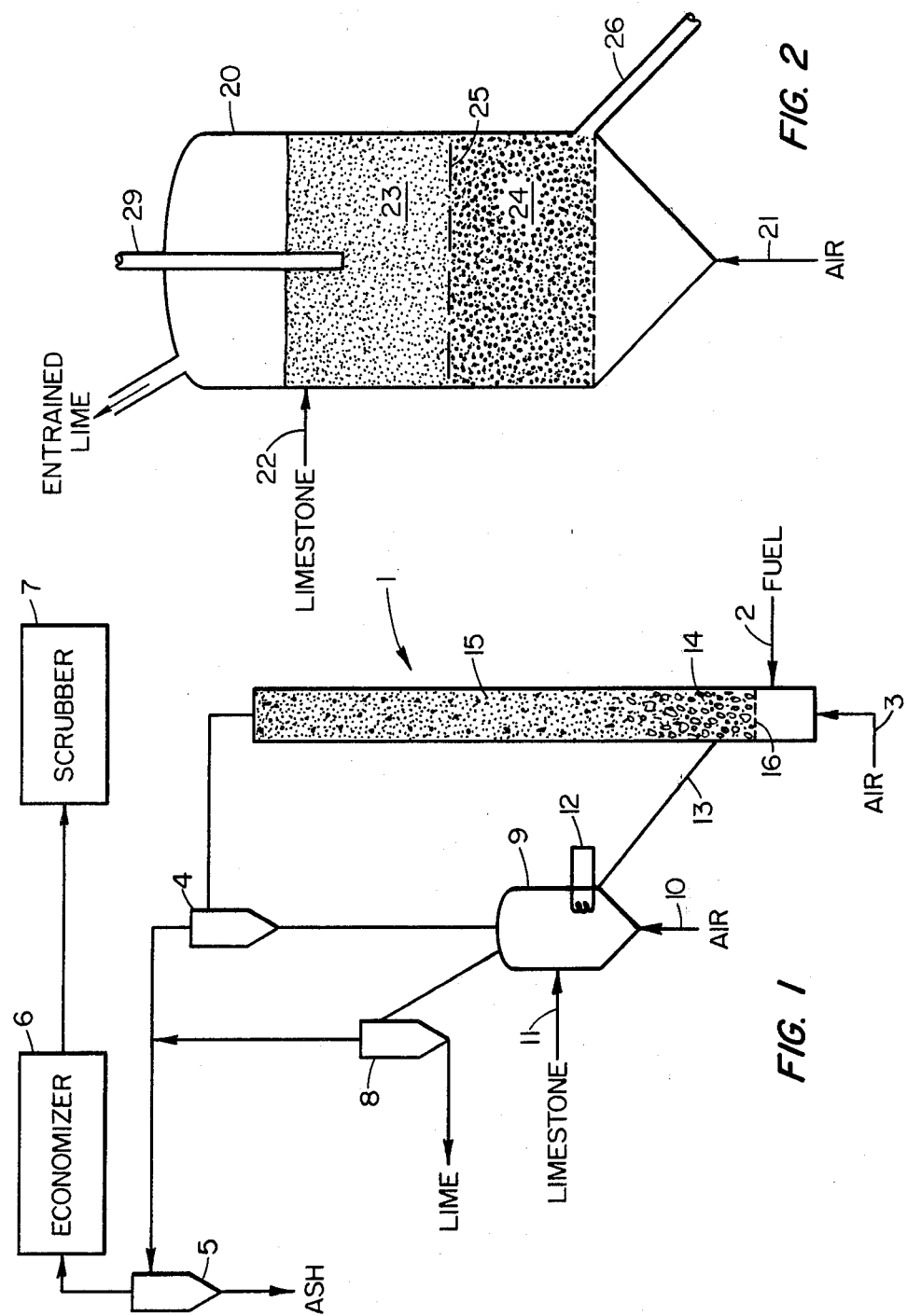

LIMESTONE CALCINATION

BACKGROUND OF THE INVENTION

The present assignee's U.S. Pat. No. 4,084,545 describes the use of a multisolid fluidized bed as a combustor to burn various materials. This patent also discloses the recovery of heat from such combustion in a heat exchanger remote from the combustor through the use of recirculating entrained bed of fine particles. The particles pick up heat in the combustor and carry it to the external heat exchanger where the heat is given to heat exchange tubing and the heat exchange medium carried therein. This U.S. Pat. No. 4,084,545, which is incorporated herein by reference, contains a good description of apparatus which may be modified in accordance with the invention to calcine limestone in the external heat exchanger, also known herein as the secondary fluidized bed because of the addition of a fluidizing gas.

L. Reh, in his paper on "Fluid Bed Combustion in Processing, Environmental Protection and Energy Supply", presented at the International Fluidized Bed Combustion Symposium of the American Flame Research Committee, Apr. 30, 1979, in Boston, refers to well-known commercial fluidized bed calcining of alumina and suggests that limestone calcination could also be practiced in the circulating fluidized beds (p. 18). The alumina calciner consists of a circulating fluidized bed established with the combustion gases wherein an aluminum compound (aluminum trihydrate) is fed into the main combustion chamber of the fluidized bed, calcined therein, recycled internally against the gas flow and externally through a recycling cyclone and discharged in finely divided form from the bottom of the cyclone.

U.S. Pat. No. 2,700,592 discloses a method for treating endothermically-reactive, fluidizable solid particles capable of yielding an oxidizable product as a result of endothermic reaction. The endothermically-reactive particles are reacted to the oxidizable product in a first fluidized bed using heat from inert particles. The oxidizable product and the inert particles are then cycled to a second fluidized bed wherein the oxidizable product is burned to heat the inert particles for recycle back to the first fluidized bed.

The most common current methods for converting limestone to lime comprises introducing the limestone into a rotary kiln wherein it is calcined by the heat from the combustion of fuel, such as oil or gas, in the kiln. The product is a lime clinker having substantial impurities, including unburned carbon and ash, associated therewith.

SUMMARY OF THE INVENTION

It is an object of the invention to provide a calcination method for limestone which produces a fine-powdered lime product substantially free of impurities.

In accordance with the objective, the invention is a method for producing an ash-free, finely divided, particulate lime product from a limestone raw material which comprises generating heat from the combustion of fuel in a primary, entrained-bed combustor having relatively fine particles entrained in a primary fluidizing gas, transferring the heat of combustion to the fine particles in the combustor, circulating the heated, fine particles with the primary fluidizing gas to an external secondary fluidized bed, removing impurities from the primary fluidizing gas prior to entry in the secondary fluidized bed, introducing particulate limestone and a secondary fluidizing gas into the secondary fluidized bed such that the limestone comes in contact with the circulating, fine particles thereby relatively cooling the fine particles and heating the particulate limestone and decomposing it to particulate lime, recycling the relatively cool, fine, entrained-bed particles from the secondary fluidized bed to the primary entrained-bed combustor, and recovering the particulate lime from the secondary fluidized bed.

The primary entrained bed combustor preferably is a multisolid bed having a coarse, dense fluidized bed in addition to the fine entrained bed. Temperature in the primary bed is preferably about 1700°–2200° F. while the secondary bed is preferably about 1550°–1700° F.

A restrictor plate can be used in the secondary bed to keep the fine lime product from following the fine particles back to the combustor where they would be circulated and removed with the ash.

DESCRIPTION OF THE DRAWING

FIG. 1 is a schematic view of the apparatus for practicing the inventive method.

FIG. 2 shows the design of a preferred secondary fluidized bed reactor unit.

DETAILED DESCRIPTION

The present rotary kiln method for calcining limestone results in an agglomerated product containing impurities. Calcination in a fluidized bed combustor may result in a fine powder product, but still remains commingled with combustion products, particularly ash, which are hard to separate because of similar properties.

To produce a fine powder lime product without contamination the present invention utilizes a primary, entrained-bed combustor and a secondary (external) fluidized bed. An entrained bed combustor is a "fluidized" bed in which relatively fine particles are entrained in the fluidizing gas, fuel is burned in a lower region thereof, and heat from the combustion of the fuel is transferred to the entrained particles passing through the combustion region. In the invention, the entrained fine particles are transported out of the combustor by the fluidizing gas and are captured in a cyclone to be thereafter directed in preselected quantities to the secondary (external) fluidized bed. The fine particles are recycled through the secondary fluidized bed and back into the combustor to be reheated and recirculated.

The entrained bed combustor is preferably a multisolid fluidized bed apparatus which is designed to practice the method disclosed in U.S. Pat. No. 4,084,545. Information useful in using the multisolid fluidized bed in the present invention is contained therein and will not be repeated in excessive detail here. In summary, however, the operation of a multisolid fluidized bed comprises forming the entrained bed in a first space region containing the relatively fine solid bed particle component, forming in a more limited space region within the first region a dense fluidized bed containing a relatively larger solid bed particle component essentially comprising a material having long-term physical and chemical stability in the fluidized bed system so as to be substantially non-agglomerating and not subject to substantial attrition therein, providing a recirculation path such as through a cyclone separator and particle reservoir for the fine particle component from the first space region through the dense fluidized bed in the more limited space region, and operating the fluidized bed system at a velocity such that the larger component particles are effectively retained in the dense fluidized bed in the more limited space region, whereas the fine component particles recirculate and interpenetrate therethrough, commingling with the larger component particles. Used as a combustor, fuel such as particulate coal or oil is introduced at the bottom of the dense bed or lump coal is introduced into or above the dense bed and a sorbent material such as limestone may be added above or below the dense bed to capture $SO_2$.

The preferred use of the multisolid fluidized bed is best understood by looking at FIG. 1 which is a schematic drawing of the system employed in practicing the invention. Operation of the entrained bed combustor in a single particle mode is similar excepting the contribution of the dense fluidized bed. The primary entrained-bed combustor 1 is a multisolid fluidized bed such as described in the above mentioned U.S. Pat. No. 4,084,545. A relatively large particle component is fluidized in a dense bed 14 by a fluidizing gas 3 through distributor plate 16. The dense bed region is contained within the large entrained bed 15 in which relatively fine particles are temporarily retained. The fine particles are entrained in the fluidizing gas 3 and are eventually removed out the top of the combustor and captured in cyclone 4. The fine particles are then recycled back to the dense bed of the combustor through the secondary (external) fluidized bed 9 and recycle conduit 13.

Combustion gases separated in cyclone 4 are taken to separator 5 where ash may be removed and then, if desired, cycled through an economizer 6 and flue gas scrubber 7.

Recirculating fine particles which proceed from the cyclone 4 into the secondary bed 9 are made to contact limestone which enters at the feed port 11. Residence time and contact between the limestone and the recirculating fine particles are increased by fluidizing the particles in secondary fluidizing gas entering at 10 which then carries the calcined lime product through cyclone 8 for recovery. The secondary fluidizing gas has a lower space velocity than the primary fluidizing gas 3 in the primary combustor and the fine recirculating particles (which are denser than the lime product) are able to move out the bottom of the secondary fluidized bed against the secondary fluidizing gas and back to the primary combustor.

The inventive method using the apparatus of FIG. 1 may be explained as follows. Fluidizing gas 3 (typically air) is introduced through distributor plate 16 at a space velocity sufficient to fluidize the large particles into a stationary dense bed 14 and to entrain the fine particles into a recirculating fine bed 15. Fuel enters the combustor at 2 and is burned therein giving up heat to the large particles in the dense bed and to the recirculating fine particles. Temperatures on the order of 1700°–2200° F. are employed.

The heated fine particles are entrained with the fluidizing gas out the top of the combustor and are separated from the gas by cyclone 4. The gas is removed for ash separation, cleaning and scrubbing and heat removal. The heated fine particles are directed to the secondary (external) fluidized bed wherein they contact particulate limestone introduced at 11. Secondary fluidizing gas 10 fluidizes the limestone particles and increases the residence time of the recirculating fine particles enough for heat transfer to occur and for the limestone particles to be heated and decomposed at about 1600° F. into lime and carbon dioxide. Excess heat from the recirculating fine particles may be used to produce or superheat steam through heat exchange coils 12.

The secondary fluidizing gas entrains and removes the particulate lime product out the top of the secondary fluidized bed reactor to be captured in cyclone 8 and recovered. The off gas from the cyclone 8 continues into the waste stream from the primary combustor.

The recirculating fine particles are dense enough to move against the secondary fluidizing gas out the bottom of the secondary fluidized bed and back to the dense bed in primary fluidized bed through recycle conduit 13.

The secondary fluidized bed reactor may experience trouble in separating the lime from the fine recirculating particles such that some lime may be recycled to the primary combustor. In some cases this would be desirable to aid sulfur dioxide capture in the primary combustor. However, to prevent this recycle in other cases, the alternative apparatus of FIG. 2 is preferred. The secondary fluidized bed reactor 20 is shown with a pipe 29 for introducing the heated, fine, recirculating particles from the combustor and pipe 26 for recycling the fine particles to the primary combustor. A restriction plate 25 is located intermediate the pipes 26 and 29 and limestone is introduced above the restriction plate 25 at feed port 22. The restriction plate causes the less dense limestone and lime product to remain predominantly thereabove while the recirculating, fine particles may pass downwardly therethrough.

I claim:

1. A method for producing a finely-divided lime powder substantially free of ash from a limestone raw material which comprises
    (A) generating heat from the combustion of fuel in a primary, entrained-bed combustor having relatively fine particles entrained in a primary fluidizing gas,
    (B) transferring heat of combustion of the fuel to the fine, entrained-bed particles in the combustor,
    (C) circulating at least a portion of the heated, fine, entrained-bed particles to an external, secondary fluidized bed,
    (D) removing impurities from the portion of heated, fine, entrained-bed particles prior to entry in the secondary fluidized bed,
    (E) introducing particulate limestone and a secondary fluidizing gas into the secondary fluidized bed such that the limestone comes into contact with the heated, fine, entrained-bed particles thereby heating the particulate limestone and decomposing it to particulate lime,
    (F) recycling the relatively cool, fine, entrained-bed particles from the secondary fluidized bed to the primary entrained-bed combustor, and
    (G) recovering the particulate lime from the secondary fluidized bed.

2. The method of claim 1 for calcining limestone wherein the primary, entrained-bed combustor further comprises a stable, dense fluidized bed of relatively coarse particles through which at least some of the fine, entrained-bed particles are recycled.

3. The method of claim 1 for calcining limestone wherein additional heat is recovered from the fine, entrained-bed particles in the secondary fluidized bed which comprises contacting the fine, entrained-bed particles with heat exchange tubing carrying a heat exchange fluid.

4. The method of claim 1 for calcining limestone wherein the lime product is prevented from circulating with the fine, entrained-bed particles back to the primary combustor which comprises separating the secondary fluidized bed into upper and lower regions with a restriction plate, introducing the particulate limestone above the restriction plate and introducing the secondary fluidizing gas into the secondary fluidized bed at such space velocity that it may pass through the restriction plate and maintain the limestone and lime product thereabove but allow the fine, entrained-bed particles to pass countercurrent thereto into the lower region.

* * * * *